(12) United States Patent
Sasaki

(10) Patent No.: US 12,223,177 B2
(45) Date of Patent: Feb. 11, 2025

(54) MEMORY SYSTEM AND CONTROL METHOD

(71) Applicant: Kioxia Corporation, Tokyo (JP)

(72) Inventor: Tatsuya Sasaki, Tokyo (JP)

(73) Assignee: Kioxia Corporation, Tokyo (JP)

( * ) Notice: Subject to any disclaimer, the term of this patent is extended or adjusted under 35 U.S.C. 154(b) by 39 days.

(21) Appl. No.: 18/182,546

(22) Filed: Mar. 13, 2023

(65) Prior Publication Data

US 2024/0078019 A1 Mar. 7, 2024

(30) Foreign Application Priority Data

Sep. 5, 2022 (JP) .................................. 2022-140780

(51) Int. Cl.
*G06F 12/00* (2006.01)
*G06F 3/06* (2006.01)

(52) U.S. Cl.
CPC .......... *G06F 3/0617* (2013.01); *G06F 3/0644* (2013.01); *G06F 3/0679* (2013.01)

(58) Field of Classification Search
CPC .... G06F 3/0617; G06F 3/0644; G06F 3/0679; G06F 3/0664; G06F 3/0607; G06F 3/0661; G06F 3/0685; G06F 3/0688; G06F 12/0238; G06F 12/0246; G06F 2212/2022; G06F 2212/2024; G06F 2212/205; G06F 2212/214; G06F 2212/2142; G06F 2212/2146; G06F 2212/217; G06F 2212/72; G06F 2212/7201; G06F 2212/7202; G06F 2212/7203; G06F 2212/7204; G06F 2212/7205; G06F 2212/7206; G06F 2212/7207; G06F 2212/7208; G06F 2212/7209; G06F 2212/7211; G11C 16/3495; G11C 16/349; G11C 13/0035; G11C 11/5685; G11C 11/5678; G11C 11/5671; G11C 11/5664; G11C 11/5657; G11C 11/5642; G11C 11/5635; G11C 11/5628; G11C 11/5621; G11C 11/5614
See application file for complete search history.

(56) References Cited

U.S. PATENT DOCUMENTS

| | | | |
|---|---|---|---|
| 10,394,746 B2 | 8/2019 | Kachare | |
| 2017/0344259 A1* | 11/2017 | Freyensee | G06F 3/0632 |
| 2019/0129862 A1 | 5/2019 | Yoshida et al. | |
| 2020/0073553 A1* | 3/2020 | Klein | G06F 3/0482 |
| 2021/0004171 A1 | 1/2021 | Li et al. | |

(Continued)

FOREIGN PATENT DOCUMENTS

| | | |
|---|---|---|
| JP | 2019075104 A | 5/2019 |
| JP | 20210510215 A | 4/2021 |

(Continued)

*Primary Examiner* — Arvind Talukdar
(74) *Attorney, Agent, or Firm* — Maier & Maier, PLLC

(57) ABSTRACT

According to one embodiment, a controller creates a virtual controller based on an attached state of the namespace with respect to the storage area of the nonvolatile memory based on reception of a first command requesting connection from a first host. The controller executes processing related to an operation of the namespace requested by a second command related to the operation of the namespace based on an attached state of the namespace in the virtual controller when the second command is received from the first host.

20 Claims, 15 Drawing Sheets

(56) References Cited

U.S. PATENT DOCUMENTS

2021/0141910 A1 5/2021 Numata
2022/0236916 A1 7/2022 Esaka et al.

FOREIGN PATENT DOCUMENTS

| | | |
|---|---|---|
| JP | 2021077208 A | 5/2021 |
| TW | 1689817 B | 4/2020 |
| TW | 202230110 A | 8/2022 |

* cited by examiner

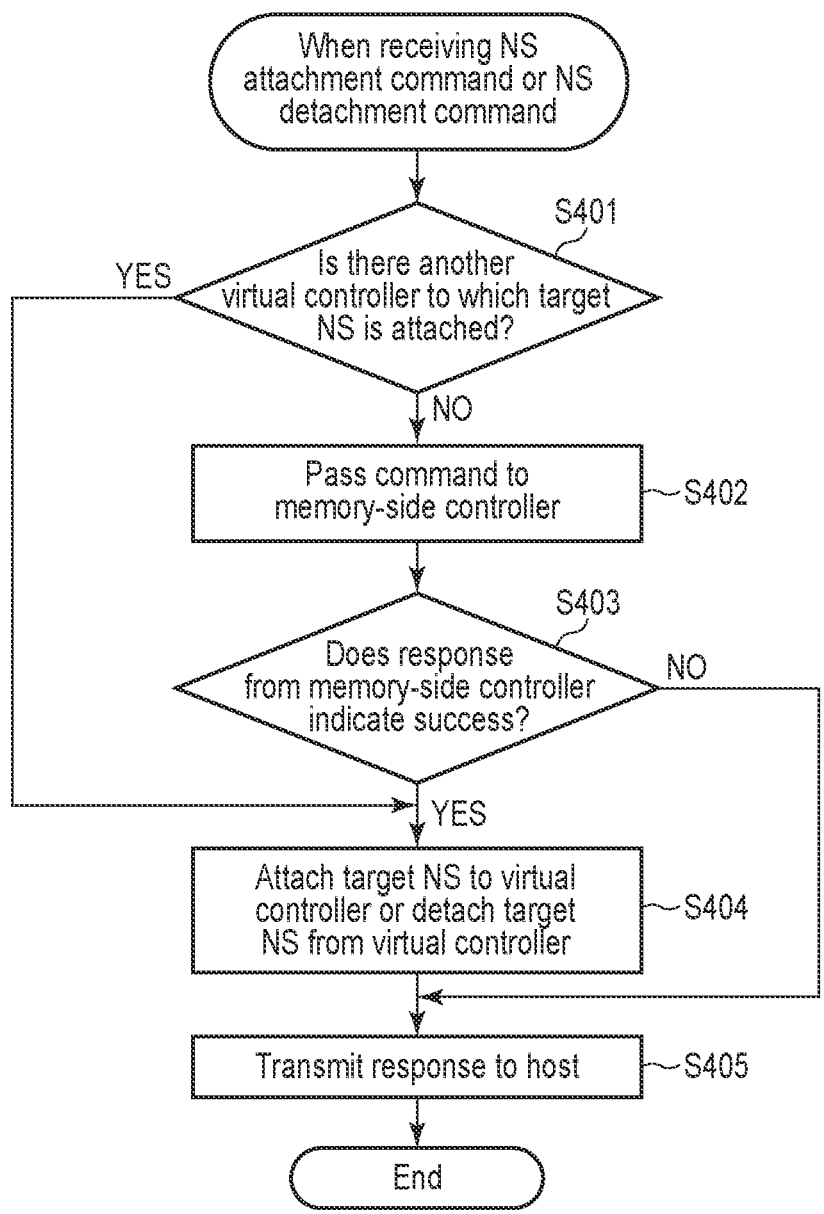
F I G. 7

| Virtual controller | Connected host | Attached NS information | | |
|---|---|---|---|---|
| | | Attached NS | NSID (Virtual controller) | NSID (Memory-side controller) |
| 1 | 1 | A | 1 | 1 |
| | | B | 2 | 2 |
| 2 | 2 | B | 1 | 2 |
| | | C | 2 | 3 |
F I G. 10
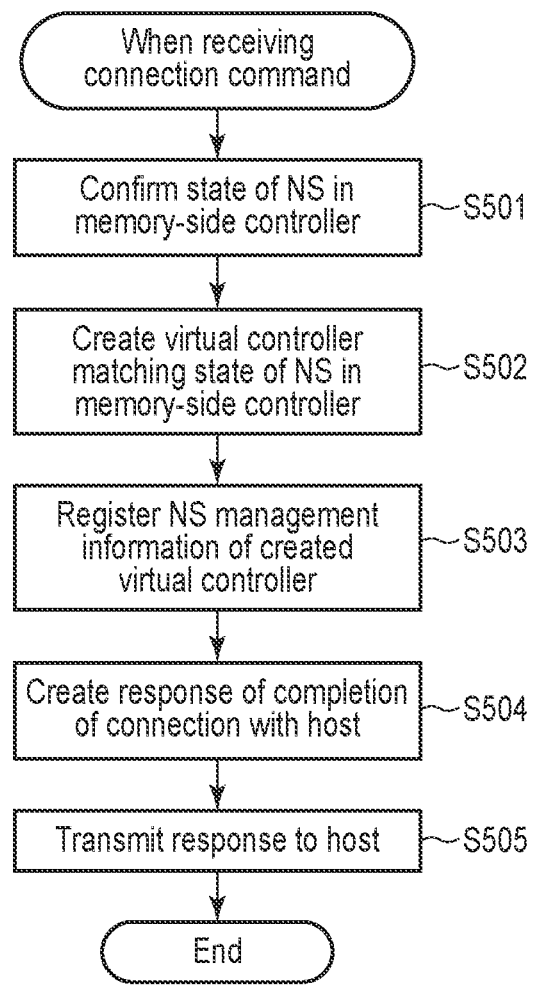
F I G. 11

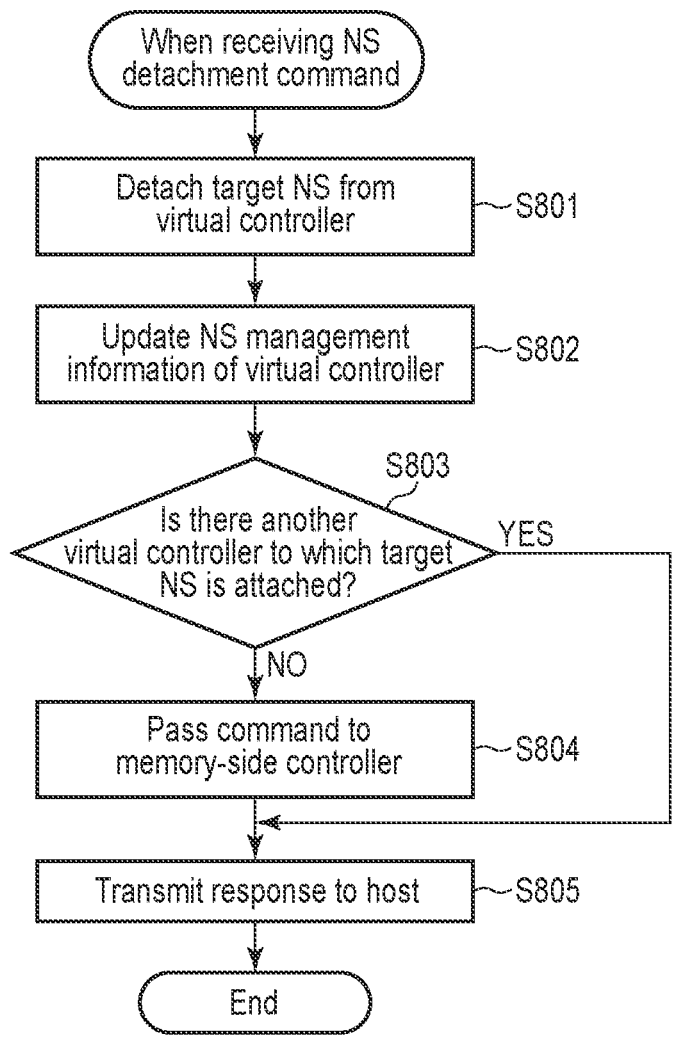
F I G. 14

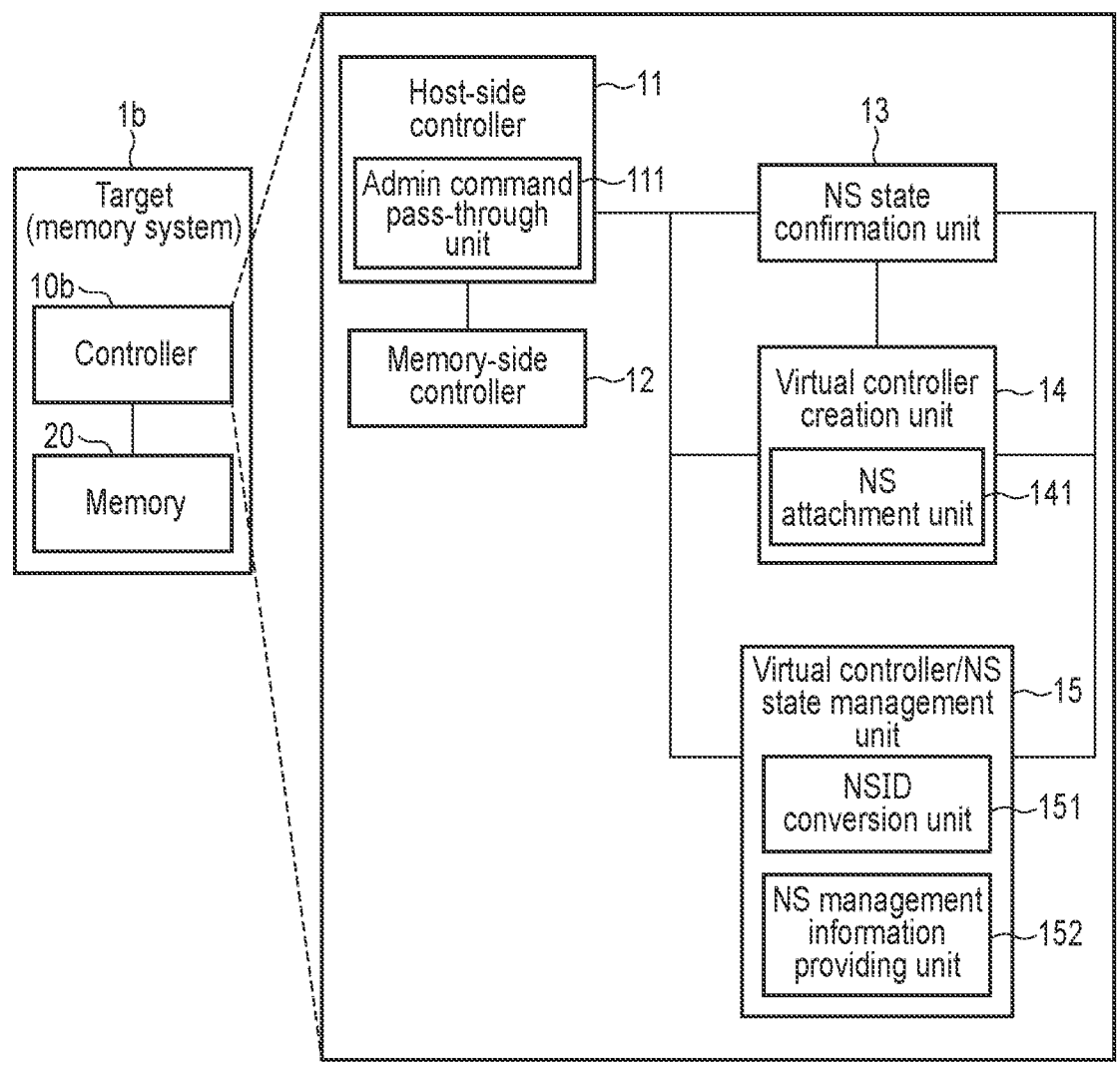
F I G. 15

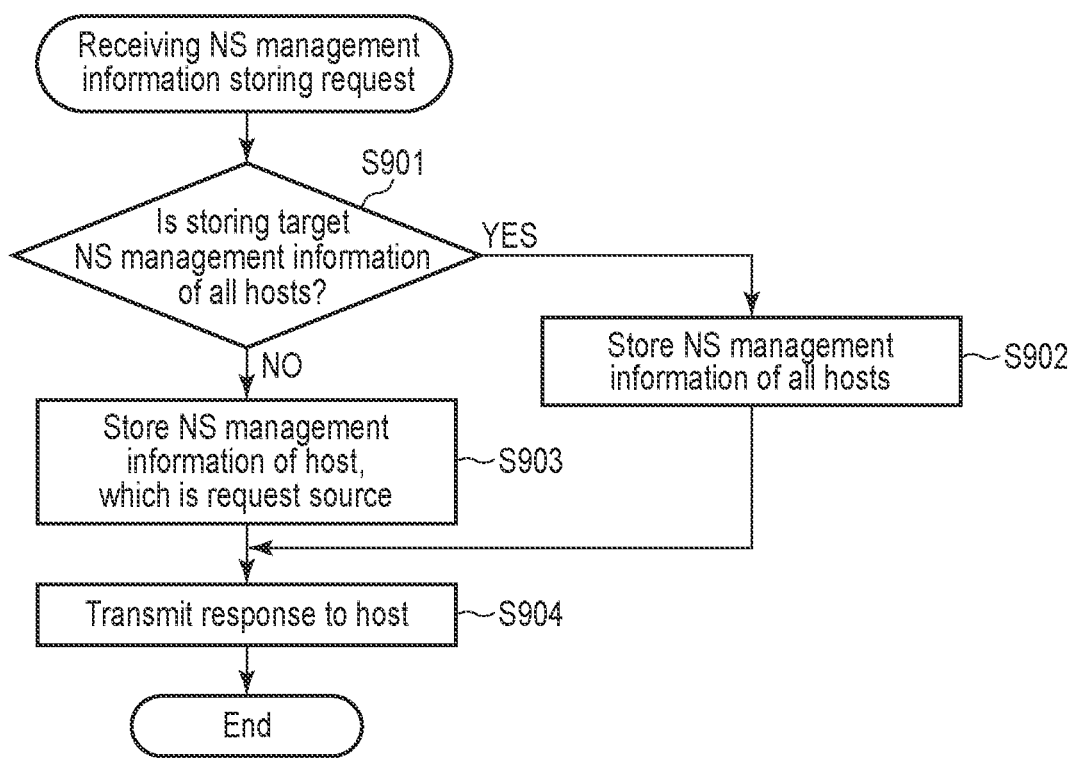
F I G. 17

MEMORY SYSTEM AND CONTROL METHOD

CROSS-REFERENCE TO RELATED APPLICATIONS

This application is based upon and claims the benefit of priority from Japanese Patent Application No. 2022-140780, filed Sep. 5, 2022, the entire contents of which are incorporated herein by reference.

FIELD

Embodiments described herein relate generally to a memory system and a control method.

BACKGROUND

NVMe™ over Fabrics (NVMe-oF) is a technology that enables a host to use a target connected via a network as a local NVMe device. The target is, for example, a memory system such as a solid state drive (SSD).

Typically, the NVMe device can logically divide a storage area of the NVMe device to create a plurality of namespaces (NSs). The NVMe device can be flexibly used by creating the plurality of NSs in the storage area. For example, a storage area of an NVMe device used by a host can be divided for each application program. Further, in a case where a plurality of hosts are connected to one target by NVMe-oF, a storage area of an NVMe device used by the plurality of hosts can be divided for each of the hosts.

In an environment where a host is directly connected to an NVMe device, the host can perform operations related to NSs, such as creation and deletion of NSs, and attachment and detachment of NSs, by transmitting Admin commands, which are commands for the NS operations, to the connected NVMe device. The attachment is an operation of incorporating an NS into an access target, and the detachment is an operation of removing an NS from the access target. Further, the deletion of an NS is to release a part of storage area of the NVMe device secured for the NS.

On the other hand, in an environment in which one target is used as a local NVMe device by the NVMe-oF that enables a plurality of hosts to use the target, an Admin command transmitted by the host to the target is treated as an unsupported command by the target, and an error response is made therefor. However, since the target makes the error response to the Admin command, an NS used by a certain host is prevented from being deleted or detached according to the Admin command transmitted to the target by another host.

In this manner, the host connected to the target via the network can use an NS in an attached state, but is not allowed to perform an operation related to the NS.

BRIEF DESCRIPTION OF THE DRAWINGS

FIG. 7 is a flowchart illustrating an operation procedure when an NS attachment or detachment command is received in the target according to the first embodiment.

FIG. 10 is a diagram illustrating an example of NS management information stored in the target according to the second embodiment.

FIG. 11 is a flowchart illustrating an operation procedure when a connection command is received in the target according to the second embodiment.

FIG. 14 is a flowchart illustrating an operation procedure when an NS detachment command is received in the target according to the second embodiment.

FIG. 15 is a diagram illustrating an example of a configuration of a controller in a target according to a third embodiment.

FIG. 17 is a flowchart illustrating an operation procedure when an NS management information storing request is received in the target according to the fourth embodiment.

DETAILED DESCRIPTION

In general, according to one embodiment, a memory system includes a nonvolatile memory and a controller. The nonvolatile memory includes a storage area. The controller is capable of communicating with one or more hosts including a first host via a network and is capable of creating a namespace by logically dividing the storage area of the nonvolatile memory. The controller creates a virtual controller based on an attached state of the namespace with respect to the storage area of the nonvolatile memory based on reception of a first command requesting connection from the first host. The virtual controller enables a request for an operation including creation, deletion, attachment, or detachment of the namespace to be received from the first host via the network and enables the first host to independently attach or detach the namespace regardless of attachment or detachment of the namespace by another host. The controller executes processing related to an operation of the namespace requested by a second command related to the operation of the namespace based on an attached state of the namespace in the virtual controller when the second command is received from the first host.

Embodiments will be described with reference to the drawings hereinafter.

First Embodiment

First, a first embodiment will be described.

Figure 1:
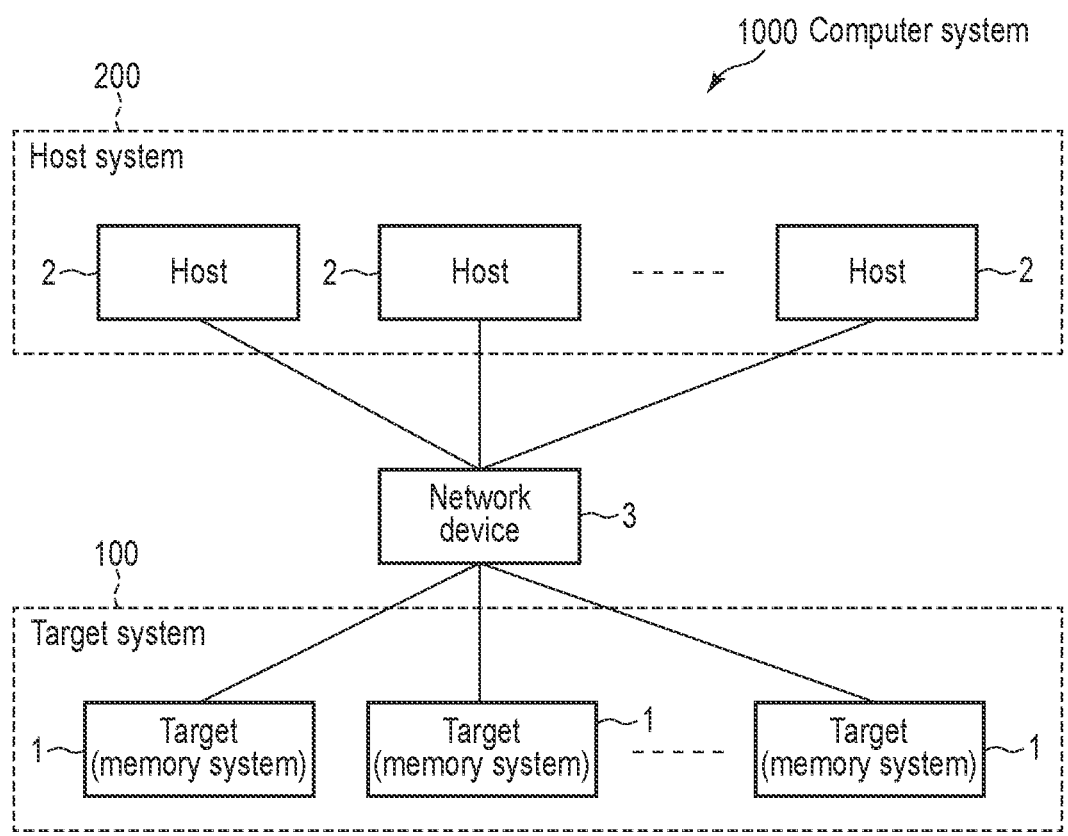
FIG. 1 is a diagram illustrating an example of a configuration of a computer system to which NVMe-oF is applied, the computer system including a target (memory system) according to a first embodiment.

FIG. 1 is a diagram illustrating an example of a configuration of a computer system 1000 to which NVMe-oF is applied, the computer system 1000 including a target (memory system) 1 according to the first embodiment.

In the computer system 1000, a target system 100 including one or more targets 1 and a host system 200 including one or more hosts 2 are connected via a network device 3. A network of the IEEE 802.3 standard is used to connect the target 1 and the network device 3 and connect the network device 3 and the host 2.

The target 1 is a storage device having a function of communicating with the host 2 according to a protocol of the NVMe-oF standard. The host 2 is an information processing apparatus such as a server and a personal computer (PC). The network device 3 is, for example, a switch or a router. The target 1 receives a command from the host 2, which is an external device, via the network device 3.

Figure 2:
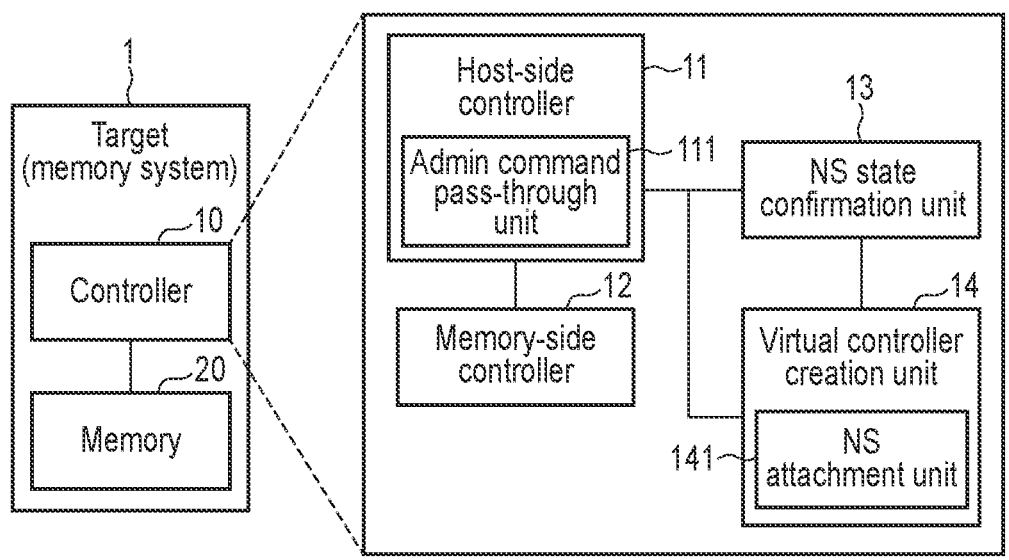
FIG. 2 is a diagram illustrating an example of a configuration of the target according to the first embodiment.

FIG. 2 is a diagram illustrating an example of a configuration of the target 1. FIG. 2 also illustrates an example of a configuration of a controller 10, which will be described later, included in the target 1.

The target 1 includes the controller 10 and a memory 20. The controller 10 is configured as a system-on-chip (SoC) or the like. The memory 20 is, for example, a NAND flash memory.

The controller 10 performs overall control of the target 1 including control of the memory 20. The above-described function of communicating with the host 2 according to the protocol of the NVMe-oF standard is implemented by the controller 10. The controller 10 can create a namespace (NS) in a storage area of the memory 20, delete an existing NS, and attach or detach an NS in response to Admin commands from the host 2. However, in the related art, it is difficult for the host 2 connected to the target 1 via the network to operate the NS by an Admin command. The controller 10 of the target 1 according to the first embodiment includes a mechanism that enables the host 2 connected to the target 1 via the network to operate the NS by the Admin command. Hereinafter, this point will be described in detail.

The controller 10 includes a host-side controller 11, a memory-side controller 12, an NS state confirmation unit 13, and a virtual controller creation unit 14. These may be implemented by a processor in the controller 10 executing a program, or may be implemented as hardware such as an electric circuit. Hereinafter, the NS state confirmation unit 13 is also referred to as the confirmation unit 13, and the virtual controller creation unit 14 is also referred to as the creation unit 14.

The host-side controller 11 receives a command or data from the host 2 via the network device 3 in, for example, a format of the IEEE 802.3 standard. The host-side controller 11 converts the received command or data into a format that can be interpreted by the memory-side controller 12, and relays the converted command or data to the memory-side controller 12. Further, the host-side controller 11 transmits a processing result of the command received from the memory-side controller 12 to the network device 3 to be addressed to the host 2 in, for example, the format of the IEEE 802.3 standard.

The host-side controller 11 includes an Admin command pass-through unit 111. Hereinafter, the Admin command pass-through unit 111 is also referred to as the pass-through unit 111. When a command from the host 2 received via the network device 3 is an Admin command related to an NS operation, the pass-through unit 111 executes processing for relaying the Admin command to the memory-side controller 12. As described above, in the related art, the Admin command from the host 2 received via the network device 3 is treated as an unsupported command, and an error response is made therefor. Note that an Admin command from a host directly connected to the target 1 is relayed to the memory-side controller 12 as in the related art without the intervention of the pass-through unit 111.

The memory-side controller 12 controls writing of data to the memory 20 and reading of data from the memory 20 according to commands received from the host-side controller 11. Further, when the Admin command related to the NS operation is received, the memory-side controller 12 can create an NS by securing a part of storage area of the memory 20, delete an NS to release a part of storage area of the memory 20 that has been secured for the NS, or attach or detach an NS.

The confirmation unit 13 confirms an attached state of an NS in the memory-side controller 12 on the basis of an instruction from the host-side controller 11. The instruction from the host-side controller 11 to the confirmation unit 13 is executed when a connection command for requesting connection to the target 1 is transmitted from the host 2. For example, in a case where three NS "1", NS "2", and NS "3" are created in the storage area of the memory 20, and two NS "1" and NS "2" among them are in the attached state, the confirmation unit 13 confirms that two NS "1" and NS "2" among the three NS "1", NS "2", and NS "3" are in the attached state. The confirmation unit 13 notifies the creation unit 14 of the confirmation result.

The creation unit 14 creates a virtual controller 11A (see FIG. 3) for the host 2 that has transmitted the connection command. The creation of the virtual controller 11A by the creation unit 14 is also executed on the basis of an instruction from the host-side controller 11 when the connection command is received. The creation unit 14 creates the virtual controller 11A reflecting an attached state of an NS in the memory-side controller 12 on the basis of the notification from the confirmation unit 13. For example, the virtual controller 11A in which two NS "1" and NS "2" among the three NS "1", NS "2", and NS "3" are in the attached state is created. The creation unit 14 notifies the host-side controller 11 of completion of the creation of the virtual controller 11A.

The creation unit 14 includes an NS attachment unit 141. The NS attachment unit 141 executes attachment and detachment of an NS in the virtual controller 11A on the basis of an instruction from the host-side controller 11. A timing at which the host-side controller 11 sends the instruction to the NS attachment unit 141 will be described later.

When the creation of the virtual controller 11A by the creation unit 14 is completed, the host-side controller 11 makes a response of connection completion to the host 2 via the network device 3. After the connection is completed, the host-side controller 11 manages the attached state of the NS in the virtual controller 11A and the attached state of the NS in the memory-side controller 12 in parallel. The host-side controller 11 controls access to the memory 20 according to a command transmitted by the host 2 on the basis of such management.

Figure 3:
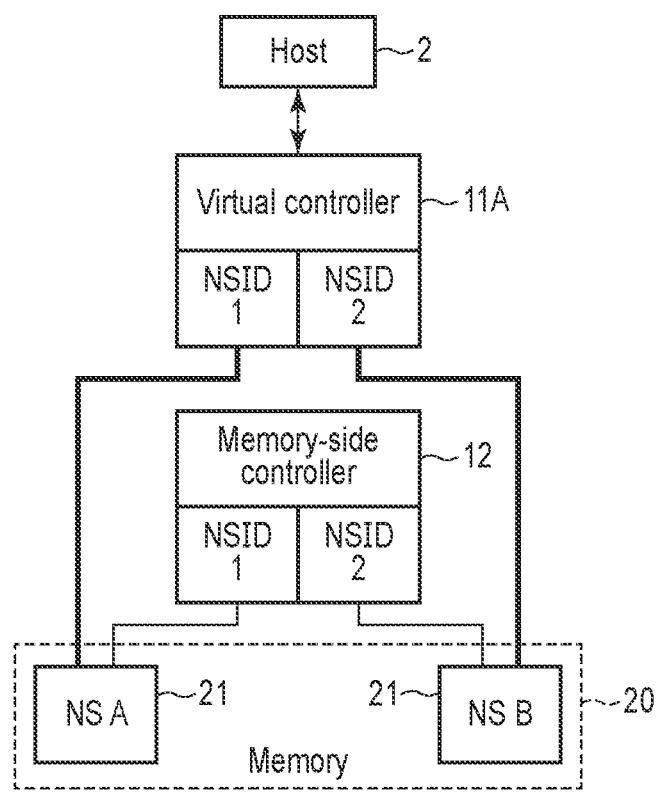
FIG. 3 is a diagram illustrating an example of a virtual controller created in the target according to the first embodiment.

FIG. 3 is a diagram illustrating an example of the virtual controller 11A created in the target 1 according to the first embodiment.

Here, an example is illustrated in which two NSs 21 "A" and 21 "B" are created in the storage area of the memory 20, and these two NSs 21 are in the attached state in the memory-side controller 12. The memory-side controller 12 identifies the NS 21 "A" as an identifier NSID "1" and identifies the NS 21 "B" as an identifier NSID "2".

Here, a case where both the NS 21 "A" and the NS 21 "B" are also in the attached state in the virtual controller 11A will be described as an example. That is, a state of the virtual controller 11A illustrated in FIG. 3 is a state of the virtual controller 11A created in response to the reception of the connection command from the host 2. In the host 2 as well, the NS 21 "A" is identified as "1", and the NS 21 "B" is identified as "2". In FIG. 3, identifiers NSID "1" and "2" illustrated in a frame of the virtual controller 11A are identifiers used by the host 2 to identify the NSs 21. When the host 2 transmits a command intended for the NS 21 "A", the identifier NSID "1" is used. As a result, for example, when the command is relayed to the memory-side controller 12, the memory-side controller 12 performs processing intended for the NS 21 "A".

Here, if the host 2 transmits an Admin command requesting detachment of the NS 21 "A", the host-side controller 11 determines whether or not the NS 21 "A" is in the attached state in the virtual controller 11A for another host 2 other than the host 2. In a case where there is another virtual controller 11A having the NS 21 "A" in the attached state, the host-side controller 11 sends, to the NS attachment unit 141, an instruction to detach the NS 21 "A" from the virtual controller 11A for the host 2 that has transmitted the Admin command, and responds to the host 2 that the detachment of the NS 21 "A" has been completed. Therefore, in this case, the pass-through unit 111 does not pass the Admin command to the memory-side controller 12, and the NS 21 "A" remains attached to the memory-side controller 12. In other words, the detachment of the NS 21 "A" is performed only in the virtual controller 11A for the host 2 that has transmitted the Admin command.

On the other hand, in a case where there is no other virtual controller 11A having the NS 21 "A" in the attached state, the host-side controller 11 first causes the pass-through unit 111 to pass the Admin command requesting the detachment to the memory-side controller 12. The memory-side controller 12 executes processing for the detachment of the NS 21 "A" in response to the Admin command. When being notified of completion of the detachment of the NS 21 "A" by the memory-side controller 12, the host-side controller 11 sends an instruction to detach the NS 21 "A" from the virtual controller 11A for the host 2 that has transmitted the Admin command to the NS attachment unit 141, and responds to the host 2 that the detachment of the NS 21 "A" has been completed. When being notified of failure of the detachment of the NS 21 "A" by the memory-side controller 12, the host-side controller 11 makes a response of the failure of the detachment of the NS 21 "A" to the host 2 without sending the instruction for the detachment of the NS 21 "A" to the NS attachment unit 141. Note that detachment may be performed in the virtual controller 11A regardless of success or failure of the detachment in the memory-side controller 12 in the case of detachment, which is different from the case of attachment to be described later. However, in a case where detachment processing in the memory-side controller 12 has failed, it is preferable to notify the host 2, which is a command transmission source, of such a result in terms of management of the target 1. Here, the failure in the detachment processing in the memory-side controller 12 is also referred to as an error in the detachment processing.

Further, it is assumed that the host 2 transmits an Admin command requesting attachment of the NS 21 "A" after the detachment of the NS 21 "A". In this case as well, the host-side controller 11 determines whether or not there is another virtual controller 11A having the NS 21 "A" in the attached state. In a case where there is another virtual controller 11A having the NS 21 "A" in the attached state, the NS 21 "A" is also in the attached state in the memory-side controller 12. The host-side controller 11 transmits, to the NS attachment unit 141, an instruction to attach the NS 21 "A" to the virtual controller 11A for the host 2 that has transmitted the Admin command, and responds to the host 2 that the attachment of the NS 21 "A" has been completed. In this case, the host-side controller 11 does not cause the pass-through unit 111 to pass the Admin command to the memory-side controller 12.

On the other hand, in a case where there is no other virtual controller 11A having the NS 21 "A" in the attached state, the host-side controller 11 first causes the pass-through unit 111 to pass the Admin command requesting the attachment to the memory-side controller 12. The memory-side controller 12 executes processing for the attachment of the NS 21 "A" in response to the Admin command. When being notified of completion of the attachment of the NS 21 "A" by the memory-side controller 12, the host-side controller 11 sends an instruction to attach the NS 21 "A" to the virtual controller 11A for the host 2 that has transmitted the Admin command to the NS attachment unit 141, and responds to the host 2 that the attachment of the NS 21 "A" has been completed. When being notified of failure of the attachment of the NS 21 "A" by the memory-side controller 12, the host-side controller 11 makes a response of the failure of the attachment of the NS 21 "A" to the host 2 without sending the instruction for the attachment of the NS 21 "A" to the NS attachment unit 141. Attachment of an NS in the virtual controller 11A is based on the assumption that the NS is also attached to the memory-side controller 12. Therefore, when the attachment of the NS in the memory-side controller 12 fails, the response of the attachment failure to the host 2 is inevitably made. Here, the response of the attachment failure is also referred to as an error response.

Next, it is assumed that the host 2 transmits an Admin command requesting deletion of the NS 21 "A". In this case as well, the host-side controller 11 determines whether or not there is another virtual controller 11A having the NS 21 "A" in the attached state. In a case where there is another virtual controller 11A having the NS 21 "A" in the attached state, it is difficult to delete the NS 21 "A", and thus the host-side controller 11 makes an error response to the host 2. In this case, the host-side controller 11 does not cause the pass-through unit 111 to pass the Admin command to the memory-side controller 12. In a case where there is no other virtual controller 11A having the NS 21 "A" in the attached state, the host-side controller 11 causes the pass-through unit 111 to pass the Admin command requesting the deletion to the memory-side controller 12. The memory-side controller 12 executes processing for the deletion of the NS 21 "A" in response to the Admin command. When being notified of completion of the deletion of the NS 21 "A" by the memory-side controller 12, the host-side controller 11 responds to the host 2 that the deletion of the NS 21 "A" has been completed. At this time, if the NS 21 "A" is in the attached state in the virtual controller 11A for the host 2 that has transmitted the Admin command, the host-side controller 11 detaches the NS 21 "A" from the virtual controller 11A for this host 2. When being notified of failure of the deletion of the NS 21 "A" by the memory-side controller 12, the host-side controller 11 responds to the host 2 that the deletion of the NS 21 "A" has failed.

In a case where the NS 21 "A" is being attached to the virtual controller 11A for the host 2 that has transmitted an Admin command requesting deletion of the NS 21 "A" when the Admin command is received, the host-side controller 11 may respond to the host 2 that the deletion of the NS 21 "A" has failed.

Further, it is assumed that the host 2 transmits an Admin command requesting creation of, for example, an NS 21 "C" as a new NS that does not exist then. At this time, the NS 21 "C" to be created is not attached to the other virtual controller 11A, the host-side controller 11 immediately causes the pass-through unit 111 to pass the Admin command requesting the creation of the new NS 21 to the memory-side controller 12. The memory-side controller 12 executes processing for the creation of the new NS 21 in response to the Admin command. When being notified of creation completion indicating that the NS 21 "C" has been created as the new NS by the memory-side controller 12, the host-side controller 11 responds to the host 2 that the NS 21 "C" has been created. When being notified of failure of the creation of the NS 21 "C", the host-side controller 11 responds to the host 2 that the creation of the NS 21 "C" has failed.

In this manner, the target 1 according to the first embodiment creates the virtual controller 11A for each of the hosts 2 requesting the connection to the target 1 by the connection command, and manages the attached state of the NS on each of the virtual controllers 11A, thereby enabling the hosts 2 connected via the network to operate the NS by the Admin command.

Figure 4:
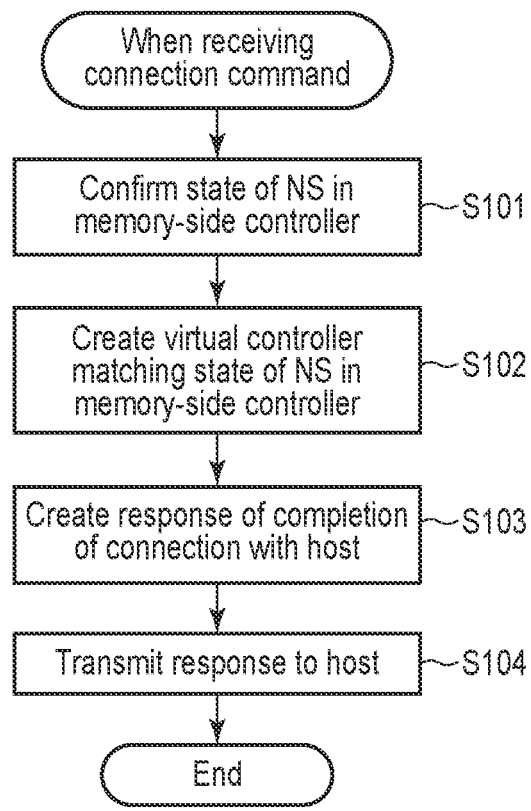
FIG. 4 is a flowchart illustrating an operation procedure when a connection command is received in the target according to the first embodiment.

FIG. 4 is a flowchart illustrating an operation procedure when a connection command is received in the target 1 according to the first embodiment.

When receiving the connection command, the confirmation unit 13 confirms an attached state of an NS in the memory-side controller 12 (S101). The creation unit 14 creates the virtual controller 11A matching the attached state of the NS in the memory-side controller 12 notified from the confirmation unit 13 (S102).

When the virtual controller 11A has been created, the host-side controller 11 creates a response of completion of connection with the host 2 (S103), and transmits the created response to the host 2 (S104).

Figure 5:
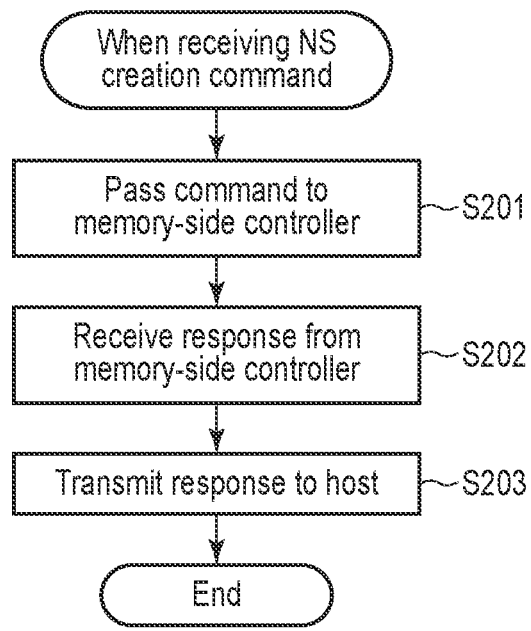
FIG. 5 is a flowchart illustrating an operation procedure when an NS creation command is received in the target according to the first embodiment.

FIG. 5 is a flowchart illustrating an operation procedure when an NS creation command is received in the target 1 according to the first embodiment.

When an Admin command received from the host 2 is the NS creation command, the host-side controller 11 immediately causes the pass-through unit 111 to relay the Admin command to the memory-side controller 12 (S201). The host-side controller 11 receives a response from the memory-side controller 12 (S202), and transmits the received response to the host 2 (S203).

Figure 6:
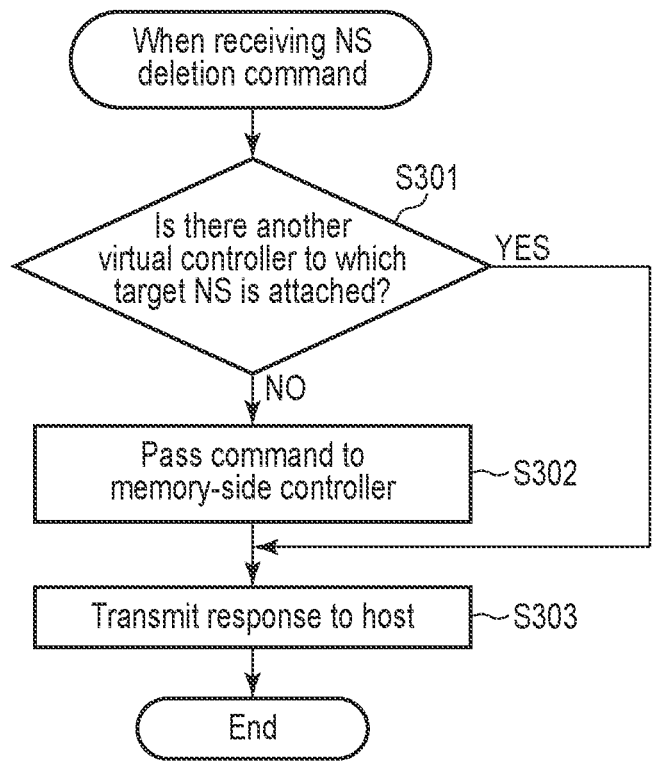
FIG. 6 is a flowchart illustrating an operation procedure when an NS deletion command is received in the target according to the first embodiment.

FIG. 6 is a flowchart illustrating an operation procedure when an NS deletion command is received in the target 1 according to the first embodiment.

The host-side controller 11 determines whether or not there is another virtual controller 11A having an NS, designated by the NS deletion command (Admin command), in an attached state (S301). The other virtual controller 11A is the virtual controller 11A created for the host 2 other than the host 2 that has transmitted the NS deletion command.

In a case where there is no other virtual controller 11A having the target NS in the attached state (S301: NO), the host-side controller 11 causes the pass-through unit 111 to relay the received NS deletion command to the memory-side controller 12 (S302). Then, the host-side controller 11 transmits the response received from the memory-side controller 12 to the host 2 (S303).

On the other hand, in a case where there is another virtual controller 11A having the target NS in the attached state (S301: YES), the host-side controller 11 transmits an error response to the host 2 without causing the pass-through unit 111 to relay the NS deletion command to the memory-side controller 12 (S303).

FIG. 7 is a flowchart illustrating an operation procedure when an NS attachment command or an NS detachment command is received in the target 1 according to the first embodiment.

The host-side controller 11 determines whether or not there is another virtual controller 11A having an NS, designated by the NS attachment command or the NS detachment command (Admin command), in an attached state (S401).

In a case where there is no other virtual controller 11A having the target NS in the attached state (S401: NO), the host-side controller 11 causes the pass-through unit 111 to relay the received NS attachment command or NS detachment command to the memory-side controller 12 (S402). The host-side controller 11 determines whether or not a response from the memory-side controller 12 indicates success (S403).

In a case where the response from the memory-side controller 12 indicates success (S403: YES), the host-side controller 11 causes the NS attachment unit 141 to attach or detach the target NS in the virtual controller 11A for the host 2 that has transmitted the NS attachment command or the NS detachment command (S404). Then, the host-side controller 11 transmits a response of attachment completion or detachment completion of the NS 21 to the host 2 (S405).

On the other hand, when the response from the memory-side controller 12 indicates failure (S403: NO), the host-side controller 11 transmits a response of attachment failure or detachment failure for the NS to the host 2 without performing the attachment or detachment of the NS in the virtual controller 11A (S405).

Further, in a case where there is another virtual controller 11A having the target NS in the attached state (S401: YES), the host-side controller 11 causes the NS attachment unit 141 to attach or detach the NS in the virtual controller 11A without relaying the command to the memory-side controller 12 (S404), and transmits the response of attachment completion or detachment completion of the NS to the host 2 (S405).

As described above, the host 2 can operate the NS via the network in the target 1 according to the first embodiment.

Second Embodiment

Figure 8:
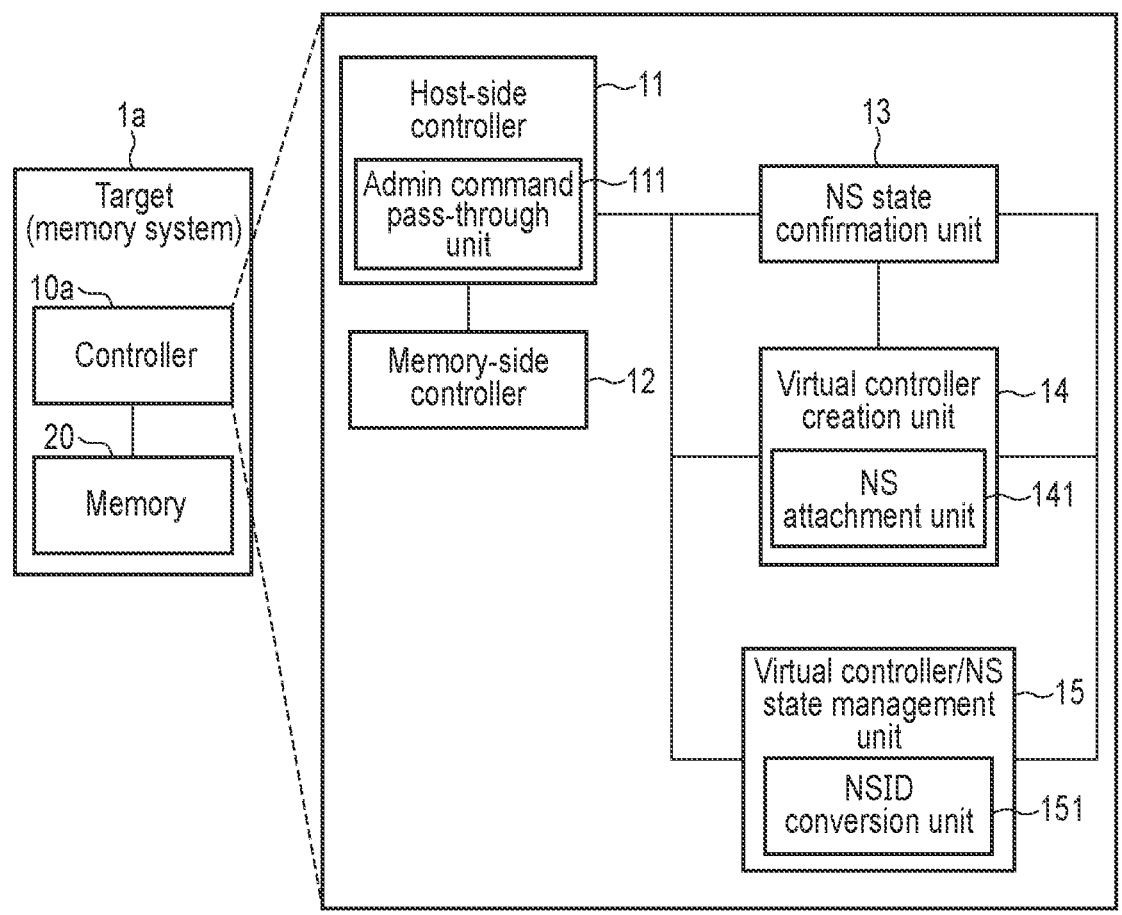
FIG. 8 is a diagram illustrating a configuration example of a controller in a target according to a second embodiment.

Next, a second embodiment will be described. FIG. 8 is a diagram illustrating an example of a configuration of a controller 10a in a target 1a according to the second embodiment.

The controller 10a according to the second embodiment further includes a virtual controller/NS state management unit 15 as compared with the controller 10 according to the first embodiment. Hereinafter, the virtual controller/NS state management unit 15 is also referred to as the management unit 15. The management unit 15 stores information (NS management information) of an NS attached to a virtual controller 11A. The management unit 15 includes an NSID conversion unit 151 that converts an NSID on the basis of the NS management information.

Figure 9:
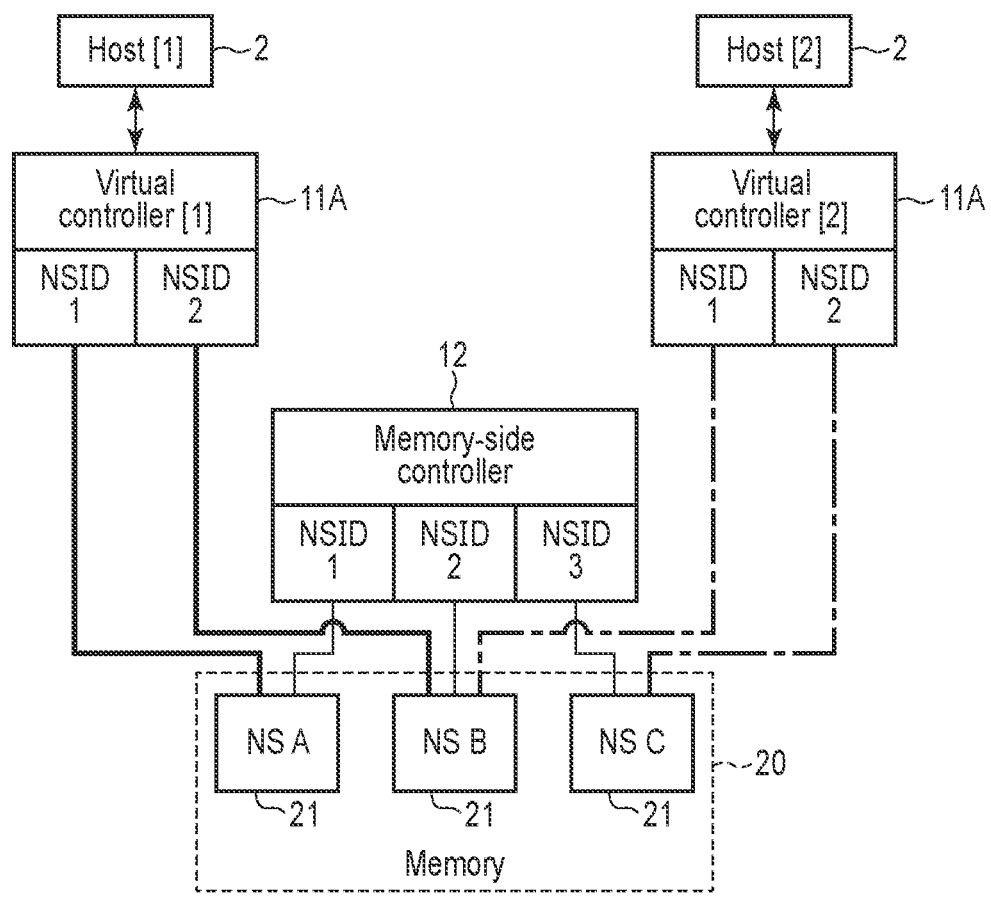
FIG. 9 is a diagram illustrating an example of an attached state of an NS in a memory-side controller and a virtual controller in the target according to the second embodiment.

FIG. 3 referred to in the description of the first embodiment illustrates a state where the attached state of the NS in the memory-side controller 12 matches the attached state of the NS in the virtual controller 11A. In NVMe-oF, a plurality of hosts 2 can be connected to the same target 1a, there may be inconsistency between an attached state of an NS in a memory-side controller 12 and an attached state of an NS in the virtual controller 11A. FIG. 9 is a diagram illustrating an example in which there is inconsistency between an attached state of an NS in the memory-side controller 12 and an attached state of an NS in the virtual controller 11A.

FIG. 9 illustrates a state where three NS 21 "A", NS 21 "B", and NS 21 "C" are created in a storage area of a memory 20. All the three NSs 21 are in a state of being attached to the memory-side controller 12. Further, the memory-side controller 12 identifies the NS 21 "A" as identification information NSID 1, identifies the NS 21 "B" as identification information NSID 2, and identifies the NS 21 "C" as identification information NSID 3.

On the other hand, two NSs 21 of the NS 21 "A" corresponding to identification information NSID 1 and the NS 21 "B" corresponding to identification information NSID 2 are attached to a virtual controller [1] 11A for a host [1] 2, and two NSs 21 of the NS 21 "B" corresponding to identification information NSID 1 and the NS 21 "C" corresponding to identification information NSID 2 are attached to a virtual controller [2] 11A for a host [2] 2. This state may be generated, for example, in response to reception of a connection command and a detachment command from each of the host [1] 2 and the host [2] 2. Specifically, in response to the reception of the connection command from each of the host [1] 2 and the host [2] 2, the virtual controllers [1] 11A and [2] 11A for the host [1] 2 and the host [2] 2 are first created in a state matching the attached state of the NS in the memory-side controller 12. Thereafter, in a case where a detachment command for the NS 21 "C" is received from the host [1] 2 and a detachment command for the NS 21 "A" is received from the host [2] 2, the state of FIG. 9 may be generated. If the NS 21 "C" is attached to the virtual controller [2] 11A for the host [2] 2 when the detachment command for NS 21 "C" has been transmitted from the host [1] 2, the detachment of the NS 21 "C" is performed only in the virtual controller [1] 11A for the host [1] 2. Similarly, if the NS 21 "A" is attached to the virtual controller [1] 11A for the host [1] 2 when the detachment command for NS 21 "A" has been transmitted from the host [2] 2, the detachment of the NS 21 "A" is performed only in the virtual controller [2] 11A for the host [2] 2.

Here, the host [1] 2 and the host [2] 2 adaptively allocate an identifier NSID, which is an integer of 1 or more, to each of the NSs 21 in the attached state in ascending order without a missing number. Therefore, after detaching the NS 21 "A", the host [2] 2 identifies the NS 21 "B" as an identifier NSID 1 and the NS 21 "C" as an identifier NSID 2. In this case, when the host [2] 2 transmits a command intended for the NS 21 "B" using the identifier NSID 1, the NS 21 "A" not intended by the host [2] 2 becomes a command target in the memory-side controller 12 to which the command has been relayed from the host-side controller 11.

In the target 1a according to the second embodiment, the controller 10a is further provided with the management unit 15 including the NSID conversion unit 151. As a result, even if there is inconsistency between the attached state of the NS 21 in the memory-side controller 12 and the attached state of the NS 21 in the virtual controller 11A, the NS 21 that is not intended by the host 2 is prevented from being a command target. Hereinafter, this point will be described in detail.

FIG. 10 is a diagram illustrating an example of NS management information stored in the management unit 15.

As illustrated in FIG. 10, in the NS management information, each of the virtual controllers 11A is associated with the corresponding host 2, the NS 21 in the state of being attached to the virtual controller 11A, and an identifier NSID in the virtual controller 11A and an identifier NSID in the memory-side controller 12 of each of the attached NSs. When the target 1a is in the state illustrated in FIG. 9, the management unit 15 stores the NS management information including the contents illustrated in FIG. 10.

Specifically, in the NS management information, the management unit 15 stores, for the virtual controller [1] 11A, that the use is for the host [1] 2, that the NS 21 "A" and the NS 21 "B" are attached, that an identifier NSID in the virtual controller 11A and an identifier NSID in the memory-side controller 12 of the NS 21 "A" are "1" and "1", respectively, and that an identifier NSID in the virtual controller 11A and an identifier NSID in the memory-side controller 12 of the NS 21 "B" are "2" and "2", respectively.

Further, in the NS management information, the management unit 15 stores, for the virtual controller [2] 11A, that the use is for the host [2] 2, that the NS 21 "B" and the NS 21 "C" are attached, that the identifier NSID in the virtual controller 11A and the identifier NSID in the memory-side controller 12 of the NS 21 "A" are "1" and "2", respectively, and that the identifier NSID in the virtual controller 11A and the identifier NSID in the memory-side controller 12 of the NS 21 "B" are "2" and "3", respectively.

The host-side controller 11 instructs the NSID conversion unit 151 to convert the identifier NSID of the NS 21 included in a command received from the host 2 before relaying the command to the memory-side controller 12. The NSID conversion unit 151 converts the identifier NSID of the NS 21 included in the command as necessary on the basis of the NS management information stored in the management unit 15. For example, in a case where the identifier NSID 1 is included in the command transmitted by the host [2] 2, the NSID conversion unit 151 converts the identifier NSID from "1" to "2". The host-side controller 11 relays a command including the identifier NSID 2 of the NS 21 after the conversion to the memory-side controller 12.

As a result, even when the memory-side controller 12 identifies the NS 21 "B" with the identifier NSID 2 and the host [2] 2 transmits a command designating the NS 21 "B" using the identifier NSID 1, the NS 21 "B" intended by the host [2] 2 becomes a command target in the memory-side controller 12.

FIG. 11 is a flowchart illustrating an operation procedure when a connection command is received in the target 1a according to the second embodiment. S501, S502, S504, and S505 illustrated in FIG. 11 are substantially the same processes as S101 to S104 illustrated in FIG. 4.

When receiving the connection command, the confirmation unit 13 confirms an attached state of an NS in the memory-side controller 12 (S501). The creation unit 14 creates the virtual controller 11A matching the attached state of the NS in the memory-side controller 12 notified from the confirmation unit 13 (S502). The management unit 15 registers NS management information of the created virtual controller 11A (S503).

When the virtual controller 11A is created and the NS management information of the created virtual controller 11A is registered, the host-side controller 11 creates a response of connection completion with the host 2 (S504) and transmits the created response to the host 2 (S505).

Figure 12:
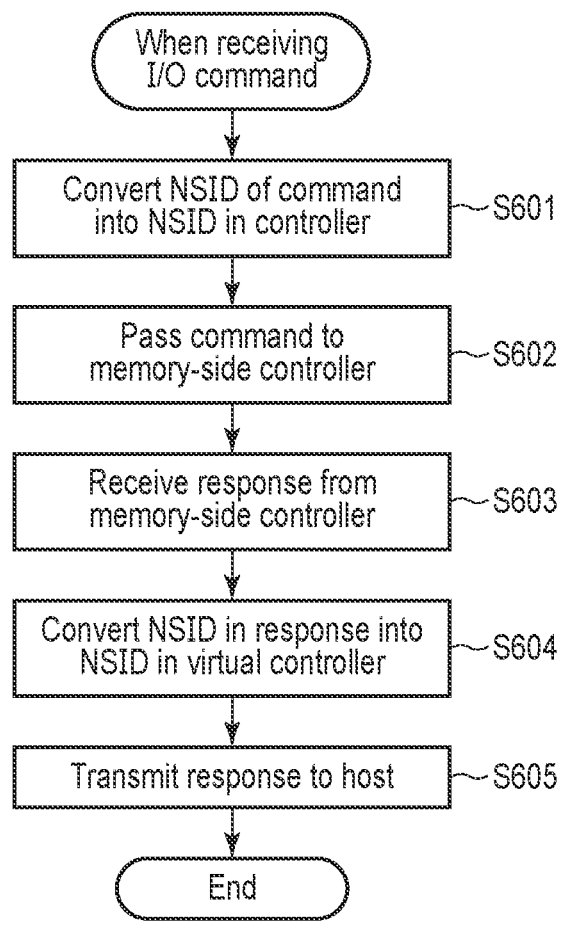
FIG. 12 is a flowchart illustrating an operation procedure when an I/O command is received in the target according to the second embodiment.

FIG. 12 is a flowchart illustrating an operation procedure when an I/O command requesting writing of data to the memory 20 or reading of data from the memory 20 is received in the target 1a according to the second embodiment.

The host-side controller 11 causes the NSID conversion unit 151 to convert the identifier NSID of the NS 21 included in the command into the identifier NSID in the memory-side controller 12 (S601). The host-side controller 11 relays the command including the converted identifier NSID of the NS 21 to the memory-side controller 12 (S602). The memory-side controller 12 executes processing related to this command.

The host-side controller 11 receives a response from the memory-side controller 12 (S603), and causes the NSID conversion unit 151 to convert the identifier NSID of the NS 21 included in the response into the identifier NSID in the virtual controller 11A (S604). The host-side controller 11 transmits a response including the converted identifier NSID of the NS 21 to the host 2 (S605).

Figure 13:
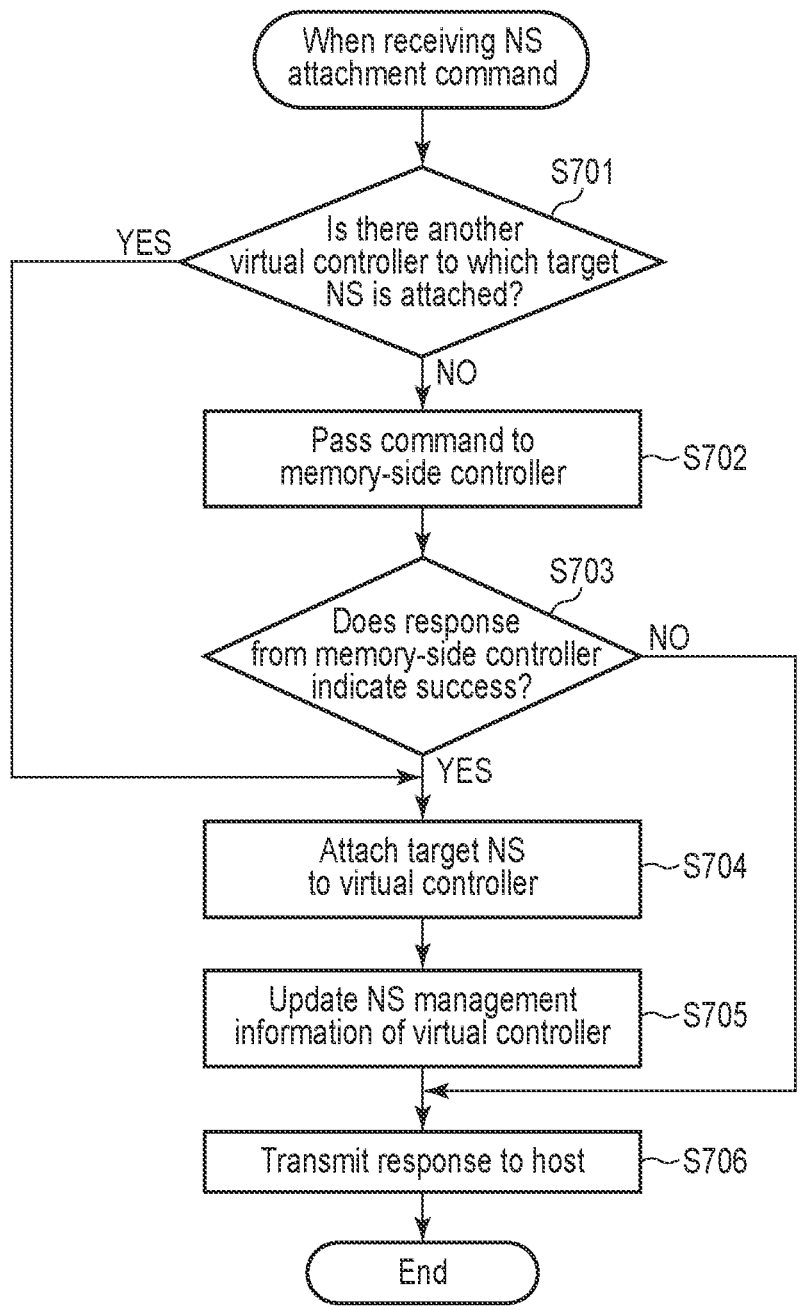
FIG. 13 is a flowchart illustrating an operation procedure when an NS attachment command is received in the target according to the second embodiment.

FIG. 13 is a flowchart illustrating an operation procedure when an NS attachment command is received in the target 1a according to the second embodiment. S701 to S704 and S706 illustrated in FIG. 13 are substantially the same processes as S401 to S405 illustrated in FIG. 4.

The host-side controller 11 determines whether or not there is another virtual controller 11A having an NS, designated by the NS attachment command (Admin command), in an attached state (S701).

In a case where there is no other virtual controller 11A having the target NS in the attached state (S701: NO), the host-side controller 11 causes the pass-through unit 111 to relay the received NS attachment command to the memory-side controller 12 (S702). The host-side controller 11 determines whether or not a response from the memory-side controller 12 indicates success (S703).

In a case where the response from the memory-side controller 12 indicates success (S703: YES), the host-side controller 11 causes the NS attachment unit 141 to attach the target NS21 in the virtual controller 11A for the host 2 that has transmitted the NS attachment command (S704). With the attachment of the NS 21, the management unit 15 updates NS management information of the virtual controller 11A for the host 2 (S705). Then, the host-side controller 11 transmits a response of attachment completion of the NS 21 to the host 2 (S706).

On the other hand, when the response from the memory-side controller 12 indicates failure (S703: NO), the host-side controller 11 transmits a response of attachment failure of the NS to the host 2 without performing the attachment of the NS in the virtual controller 11A (S706).

Further, in a case where there is another virtual controller 11A having the target NS in the attached state (S701: YES), the host-side controller 11 causes the NS attachment unit 141 to attach the NS in the virtual controller 11A without relaying the command to the memory-side controller 12 (S704). With the attachment of the NS 21, the management unit 15 updates the NS management information of the target virtual controller 11A (S705). The host-side controller 11 transmits the response of attachment completion of the NS 21 to the host 2 (S706).

FIG. 14 is a flowchart illustrating an operation procedure when an NS detachment command is received in the target 1a according to the second embodiment. Steps S803 to S805 illustrated in FIG. 14 are substantially the same as steps S401, S402, and S405 illustrated in FIG. 4, respectively.

The host-side controller 11 causes the NS attachment unit 141 to detach the target NS 21 from the virtual controller 11A for the host 2 that has transmitted the NS detachment command (S801). With the detachment of the NS 21, the management unit 15 updates NS management information of the target virtual controller 11A (S802).

Subsequently, the host-side controller 11 determines whether or not there is another virtual controller 11A having the target NS in the attached state (S803). In a case where there is no other virtual controller 11A having the target NS in the attached state (S803: NO), the host-side controller 11 causes the pass-through unit 111 to relay the received NS detachment command to the memory-side controller 12 (S804). The host-side controller 11 transmits a response from the memory-side controller 12 to the host 2 (S805).

In a case where there is another virtual controller 11A having the target NS in the attached state (S803: YES), the host-side controller 11 transmits a response indicating completion of the detachment of the NS 21 to the host 2 without relaying the command to the memory-side controller 12 (S805).

As described above, in the target 1a according to the second embodiment, the operation of the NS requested by the host 2 can be executed without any problem even when there is inconsistency between the attached state of the NS in the memory-side controller 12 and the attached state of the NS in the virtual controller 11A.

Third Embodiment

Next, a third embodiment will be described. FIG. 15 is a diagram illustrating an example of a configuration of a controller 10b in a target 1b according to the third embodiment.

In the controller 10b according to the third embodiment, a management unit 15 further includes an NS management information providing unit 152 as compared with the controller 10a according to the second embodiment. The NS management information providing unit 152 is arranged to provide NS management information to be stored in the management unit 15 to a host 2.

For example, one of a plurality of NVMe commands for which a vendor can independently define the use is allocated in advance for acquiring the NS management information. When the vendor-specific NVMe command is received from the host 2, the host-side controller 11 requests the NS management information providing unit 152 to provide the NS management information. The host-side controller 11 transmits the NS management information provided from the NS management information providing unit 152 to the host 2. Note that an API for storage management such as Redfish or a storage setting process such as Swordfish may be used to acquire the NS management information.

The target 1b according to the third embodiment is configured to be capable of providing the NS management information to the host 2. When the host 2 acquires the NS management information from the target 1b, the host 2 can recognize, for example, which NS 21 is used by which host 2. Therefore, it is possible to expect effects of preventing erroneous access at the time of using the NS 21 separately for each of the hosts 2 and reducing maintenance costs.

Fourth Embodiment

Figure 16:
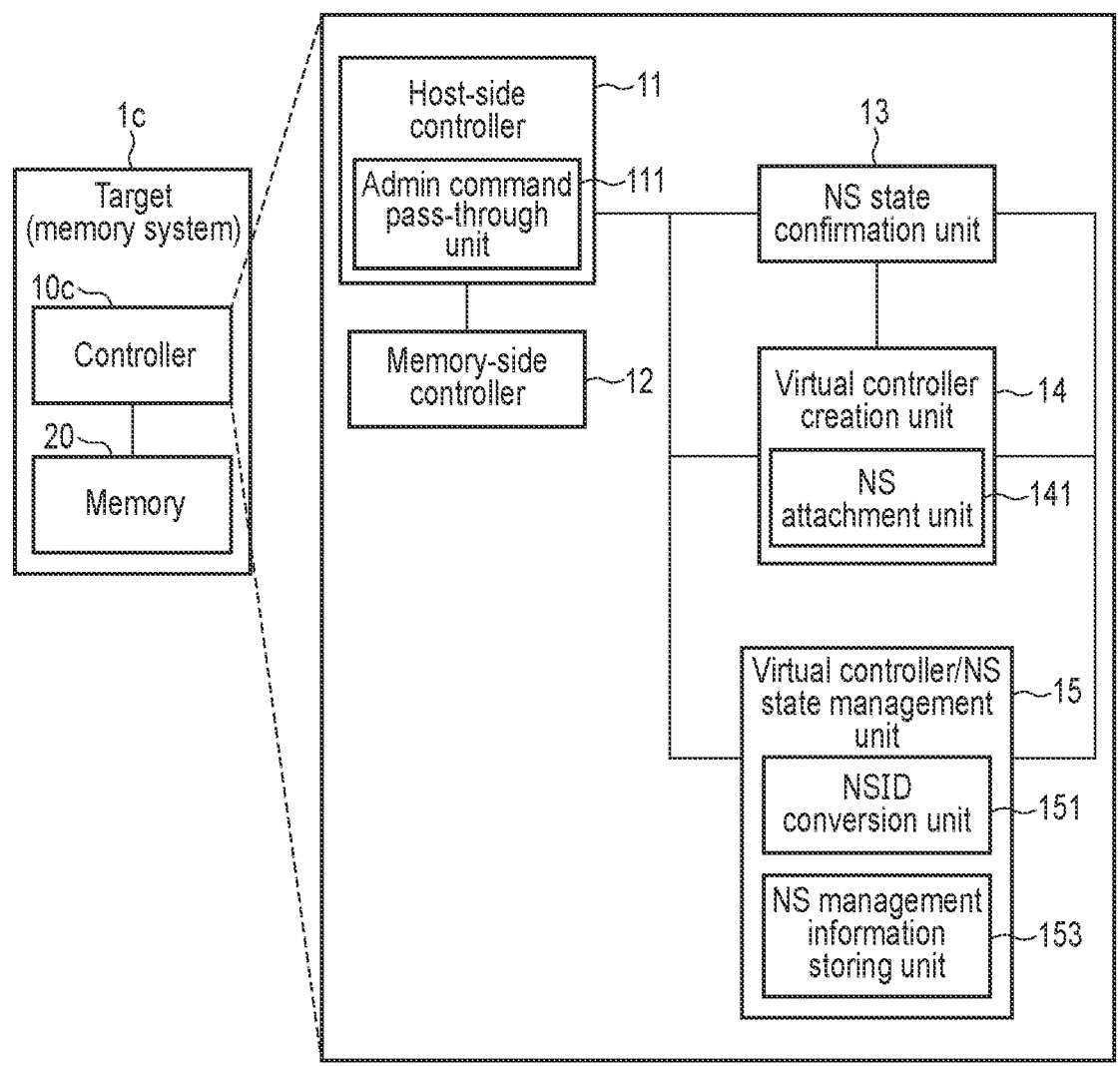
FIG. 16 is a diagram illustrating an example of a configuration of a controller in a target according to a fourth embodiment.

Next, a fourth embodiment will be described. FIG. 16 is a diagram illustrating an example of a configuration of a controller 10c in a target 1c according to the fourth embodiment.

In the controller 10c according to the fourth embodiment, a management unit 15 further includes an NS management information storing unit 153 as compared with the controller 10a according to the second embodiment. The NS management information storing unit 153 is provided to store NS management information to be stored in the management unit 15 into a memory 20.

For example, one of a plurality of NVMe commands for which a vendor can independently define the use is allocated in advance for storing NS management information. When the vendor-specific NVMe command is received from a host 2, a host-side controller 11 requests the NS management information storing unit 153 to store the NS management information into the memory 20. Note that an API for storage management such as Redfish or a storage setting process such as Swordfish may be used to store the NS management information. Further, it is preferable that the NVMe command requesting the storing of the NS management information enable storing of only the NS management information regarding a host 2 that has transmitted the command or storing of the NS management information regarding all of hosts 2 including the host 2 according to a parameter or the like.

The target 1c according to the fourth embodiment does not create a virtual controller 11A for a host 2 that has transmitted the command so as to match an attached state of an NS 21 in the memory-side controller 12 if the NS management information related to the host 2 has been stored in the memory 20 when a connection command is received. The target 1c according to the fourth embodiment creates the virtual controller 11A for the host 2 such that the attached state of the NS 21 indicated by the NS management information stored in the memory 20 is reproduced, instead of creating the virtual controller 11A.

As a result, for example, when the host 2 and the target 1c are reconnected for maintenance or failure recovery, the attached state of the NS 21 at the time of disconnection can be reproduced without performing an NS operation again from the host 2. Accordingly, it is possible to expect effects such as reduction in maintenance costs and downtime.

FIG. 17 is a flowchart illustrating an operation procedure when an NS management information storing request is received in the target 1c according to the fourth embodiment.

When the NS management information storing request is received through the vendor-specific NVMe command, for example, the host-side controller 11 determines whether or not a storing target is NS management information of all the hosts 2 (S901). When the storing target is the NS management information of all the hosts 2 (S901: YES), the host-side controller 11 causes the NS management information storing unit 153 to store the NS management information of all the hosts 2 into the memory 20 (S902), and transmits a response of NS management information storing completion to the host 2 (S904). On the other hand, when the storing target is not the NS management information of all the hosts 2 (S901: NO), the host-side controller 11 causes the NS management information storing unit 153 to store only NS management information of the host 2, which is a request source, into the memory 20 (S903), and transmits the response of the NS management information storing completion to the host 2 (S904).

Figure 18:
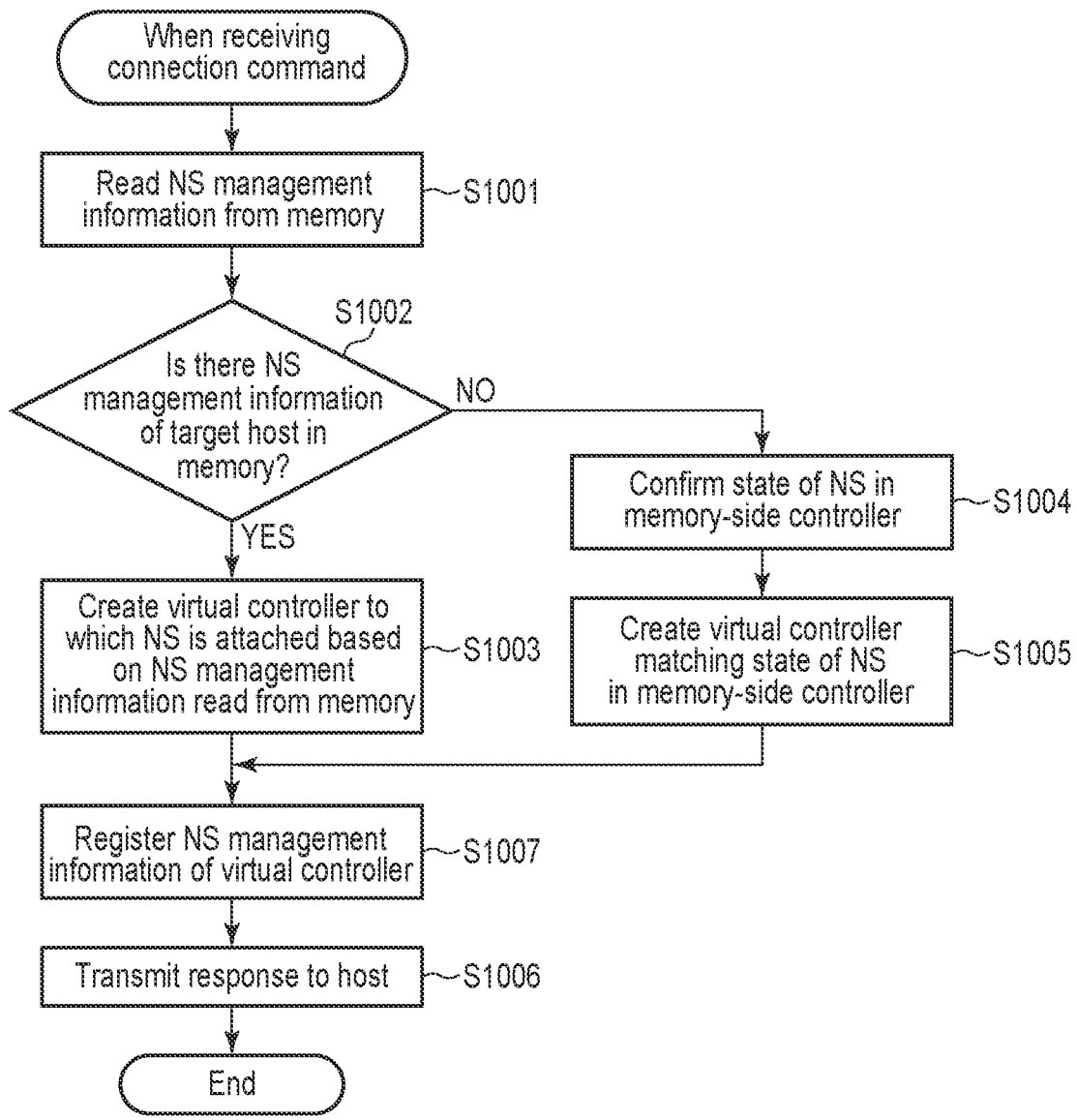
FIG. 18 is a flowchart illustrating an operation procedure when a connection command is received in the target according to the fourth embodiment.

FIG. 18 is a flowchart illustrating an operation procedure when a connection command is received in the target 1c according to the fourth embodiment.

When the connection command is received, the host-side controller 11 reads NS management information from the memory 20 (S1001). The host-side controller 11 refers to the read NS management information to determine whether or not the NS management information of the host 2 (target host 2) that has transmitted the connection command has been stored in the memory 20 (S1002).

When the NS management information of the target host 2 has been stored (S1002: YES), the creation unit 14 creates the virtual controller 11A to which the NS 21, which has been attached at the previous disconnection, is attached on the basis of the NS management information read from the memory 20 (S1003). The management unit 15 registers NS management information of the created virtual controller 11A (S1007). The host-side controller 11 transmits a response of connection completion to the host 2 (S1006).

On the other hand, when the NS management information of the target host 2 has not been stored (S1002: NO), the confirmation unit 13 confirms an attached state of an NS in the memory-side controller 12 (S1004). The creation unit 14 creates the virtual controller 11A matching the attached state of the NS in the memory-side controller 12 notified from the confirmation unit 13 (S1005). The management unit 15 registers NS management information of the created virtual controller 11A (S1007). The host-side controller 11 transmits a response of connection completion with the host 2 to the host 2 (S1006).

Since the target 1c according to the fourth embodiment can reproduce a connection state of the NS 21 at the time of disconnection when the connection is made again by storing the NS management information into the memory 20, it is possible to expect effects of cost down and reduction in downtime.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
   a nonvolatile memory including a storage area; and
   a controller capable of communicating with a plurality of hosts including a first host and a second host via a network and capable of creating a namespace by logically dividing the storage area of the nonvolatile memory,
   wherein the controller is configured to
      create a virtual controller based on an attached state of the namespace with respect to the storage area of the nonvolatile memory based on reception of a first command requesting connection from the first host, the virtual controller being configured to enable a request for an operation including creation, deletion, attachment, or detachment of the namespace to be received from the first host via the network and configured to enable the first host to independently attach or detach the namespace regardless of attachment or detachment of the namespace by the second host, execute processing related to an operation of the namespace requested by a second command related to the operation of the namespace based on an attached state of the namespace in the virtual controller when the second command is received from the first host, create a first virtual controller for the first host when the first command is received from the first host, create a second virtual controller for the second host when the first command is received from the second host, attach or detach the namespace designated by the second command in the first virtual controller when the second command requesting attachment or detachment as the operation of the namespace is received from the first host, attach or detach the namespace designated by the second command in the second virtual controller when the second command requesting attachment or detachment as the operation of the namespace is received from the second host, manage a correspondence between a first identifier of the namespace created in the nonvolatile memory and a second identifier of the namespace in a state of being attached to the first virtual controller, and manage a correspondence between the first identifier and a third identifier of the namespace in a state of being attached to the second virtual controller, convert the second identifier into the first identifier, and execute a processing relating to access requested by a third command with respect to the namespace indicated by the first identifier when the third command is received from the first host, the third command being a command in which the namespace is designated by the second identifier and requesting the access to the namespace, and convert the third identifier into the first identifier, and execute a processing related to the access requested by a fourth command with respect to the namespace indicated by the first identifier when the fourth command is received from the second host, the fourth command being a command in which the namespace is designated by the third identifier and requesting the access to the namespace.

2. The memory system of claim 1, wherein the controller is further configured to:

create a first namespace in the nonvolatile memory and attach the first namespace to the first virtual controller when the second command requesting attachment as the operation of the first namespace is received from the first host in a state where the first namespace is attached none of virtual controllers including the first virtual controller; and omit the creation of the first namespace in the nonvolatile memory and attach the first namespace to the first virtual controller when the second command requesting the attachment as the operation of the first namespace is received from the first host in a state where the first namespace is attached to a virtual controller other than the first virtual controller.

3. The memory system of claim 1, wherein the controller is further configured to:

shift a second namespace from a state of being created in the nonvolatile memory to a released state, and shift the second namespace from a state of being attached to the first virtual controller to a detached state when the second command requesting detachment as the operation of the second namespace is received from the first host in a state where the second namespace is attached to the first virtual controller and is not attached to any virtual controller other than the first virtual controller; and omit the shifting of the second namespace from the state of being created in the nonvolatile memory to the released state, and shift the second namespace from the state of being attached to the first virtual controller to the detached state when the second command requesting the detachment as the operation of the second namespace is received from the first host in a state where the second namespace is attached to the first virtual controller and any virtual controller other than the first virtual controller.

4. The memory system of claim 1, wherein the controller is further configured to:

delete a third namespace from the nonvolatile memory when the second command requesting deletion as the operation of the third namespace is received from the first host in a state where the third namespace is not attached to any virtual controller other than the first virtual controller; and transmit an error response to the first host when the second command requesting the deletion as the operation of the third namespace is received from the first host in a state where the third namespace is attached to any virtual controller other than the first virtual controller.

5. The memory system of claim 4, wherein the controller is configured to:

shift the third namespace from a state of being attached to the first virtual controller to a detached state, and delete the third namespace from the nonvolatile memory in a case where the third namespace has been attached to the first virtual controller when the second command requesting deletion of the third namespace is received from the first host in the state where the third namespace is not attached to any virtual controller other than the first virtual controller.

6. The memory system of claim 4, wherein the controller is further configured to transmit the error response to the first host in a case where the third namespace has been attached to the first virtual controller when the second command requesting the deletion as the operation of the third namespace is received from the first host in the state where the third namespace is not attached to any virtual controller other than the first virtual controller.

7. The memory system of claim 1, wherein the controller is further configured to create a namespace identified by the second command in the storage area of the nonvolatile memory when the second command requesting creation as the operation of the namespace is received from the first host.

8. The memory system of claim 1, wherein the controller is further configured to:

manage a first table that stores correspondences between identifiers of the namespace created in the storage area of the nonvolatile memory and identifiers of the namespace in a state of being attached to the virtual controller, the correspondences including the correspondence between the first identifier and the second identifier and the correspondence between the first identifier and the third identifier; and transmit the first table to the first host when a fifth command requesting the first table is received from the first host.

9. The memory system of claim 1, wherein the controller is further configured to:

manage a first table that stores correspondences between identifiers of the namespace created in the storage area of the nonvolatile memory and identifiers of the namespace in a state of being attached to the virtual controller, the correspondences including the correspondence between the first identifier and the second identifier and the correspondence between the first identifier and the third identifier; and store the first table into the nonvolatile memory when a sixth command requesting storage of the first table into the nonvolatile memory is received from the first host.

10. A control method for a memory system comprising a nonvolatile memory that includes a storage area and capable of communicating with a plurality of hosts including a first host and a second host via a network and capable of creating a namespace by logically dividing the storage area, the control method comprising:

creating a virtual controller based on an attached state of the namespace with respect to the storage area of the nonvolatile memory based on reception of a first command requesting connection from the first host, the virtual controller being configured to enable a request for an operation including creation, deletion, attachment, or detachment of the namespace to be received from the first host via the network and configured to enable the first host to independently attach or detach the namespace regardless of attachment or detachment of the namespace by the second host;

executing processing related to an operation of the namespace requested by a second command related to the operation of the namespace based on an attached state of the namespace in the virtual controller when the second command is received from the first host;

creating a first virtual controller for the first host when the first command is received from the first host;

creating a second virtual controller for the second host when the first command is received from the second host;

attaching or detaching the namespace designated by the second command in the first virtual controller when the second command requesting attachment or detachment as the operation of the namespace is received from the first host;

attaching or detaching the namespace designated by the second command in the second virtual controller when the second command requesting attachment or detachment as the operation of the namespace is received from the second host;

managing a correspondence between a first identifier of the namespace created in the nonvolatile memory and a second identifier of the namespace in a state of being attached to the first virtual controller, and managing a correspondence between the first identifier and a third identifier of the namespace in a state of being attached to the second virtual controller;

converting the second identifier into the first identifier, and executing a processing relating to access requested by a third command with respect to the namespace indicated by the first identifier when the third command is received from the first host, the third command being a command in which the namespace is designated by the second identifier and requesting the access to the namespace; and converting the third identifier into the first identifier, and executing a processing related to the access requested by a fourth command with respect to the namespace indicated by the first identifier when the fourth command is received from the second host, the fourth command being a command in which the namespace is designated by the third identifier and requesting the access to the namespace.

11. The control method of claim 10, further comprising:

creating a first namespace in the nonvolatile memory and attaching the first namespace to the first virtual controller when the second command requesting attachment as the operation of the first namespace is received from the first host in a state where the first namespace is attached none of virtual controllers including the first virtual controller; and omitting the creation of the first namespace in the nonvolatile memory and attaching the first namespace to the first virtual controller when the second command requesting the attachment as the operation of the first namespace is received from the first host in a state where the first namespace is attached to a virtual controller other than the first virtual controller.

12. The control method of claim 10, further comprising:

shifting a second namespace from a state of being created in the nonvolatile memory to a released state, and shifting the second namespace from a state of being attached to the first virtual controller to a detached state when the second command requesting detachment as the operation of the second namespace is received from the first host in a state where the second namespace is attached to the first virtual controller and is not attached to any virtual controller other than the first virtual controller; and omitting the shifting of the second namespace from the state of being created in the nonvolatile memory to the released state, and shifting the second namespace from the state of being attached to the first virtual controller to the detached state when the second command requesting the detachment as the operation of the second namespace is received from the first host in a state where the second namespace is attached to the first virtual controller and any virtual controller other than the first virtual controller.

13. The control method of claim 10, further comprising:

deleting a third namespace from the nonvolatile memory when the second command requesting deletion as the operation of the third namespace is received from the first host in a state where the third namespace is not attached to any virtual controller other than the first virtual controller; and transmitting an error response to the first host when the second command requesting the deletion as the operation of the third namespace is received from the first host in a state where the third namespace is attached to any virtual controller other than the first virtual controller.

14. The control method of claim 13, further comprising:

shifting the third namespace from a state of being attached to the first virtual controller to a detached state, and deleting the third namespace from the nonvolatile memory in a case where the third namespace has been attached to the first virtual controller when the second command requesting deletion of the third namespace is received from the first host in the state where the third namespace is not attached to any virtual controller other than the first virtual controller.

15. The control method of claim 13, further comprising: transmitting the error response to the first host in a case where the third namespace has been attached to the first virtual controller when the second command requesting the deletion as the operation of the third namespace is received from the first host in the state where the third namespace is not attached to any virtual controller other than the first virtual controller.

16. The control method of claim 10, further comprising: creating a namespace identified by the second command in the storage area of the nonvolatile memory when the second command requesting creation as the operation of the namespace is received from the first host.

17. The control method of claim 10, further comprising: managing a first table that stores correspondences between identifiers of the namespace created in the storage area of the nonvolatile memory and identifiers of the namespace in a state of being attached to the virtual controller, the correspondences including the correspondence between the first identifier and the second identifier and the correspondence between the first identifier and the third identifier; and
transmitting the first table to the first host when a fifth command requesting the first table is received from the first host.

18. The control method of claim 10, further comprising: managing a first table that stores correspondences between identifiers of the namespace created in the storage area of the nonvolatile memory and identifiers of the namespace in a state of being attached to the virtual controller, the correspondences including the correspondence between the first identifier and the second identifier and the correspondence between the first identifier and the third identifier; and
storing the first table into the nonvolatile memory when a sixth command requesting storage of the first table into the nonvolatile memory is received from the first host.

19. The memory system of claim 1, wherein the nonvolatile memory includes a NAND flash memory.

20. The control method of claim 10, wherein the nonvolatile memory includes a NAND flash memory.

* * * * *